March 17, 1942.  N. WINDSOR  2,276,905
SHEET GRAB FOR HOISTS
Filed July 27, 1940  2 Sheets-Sheet 1

INVENTOR.
Nelson Windsor,
BY
attys.

March 17, 1942. N. WINDSOR 2,276,905
SHEET GRAB FOR HOISTS
Filed July 27, 1940 2 Sheets-Sheet 2
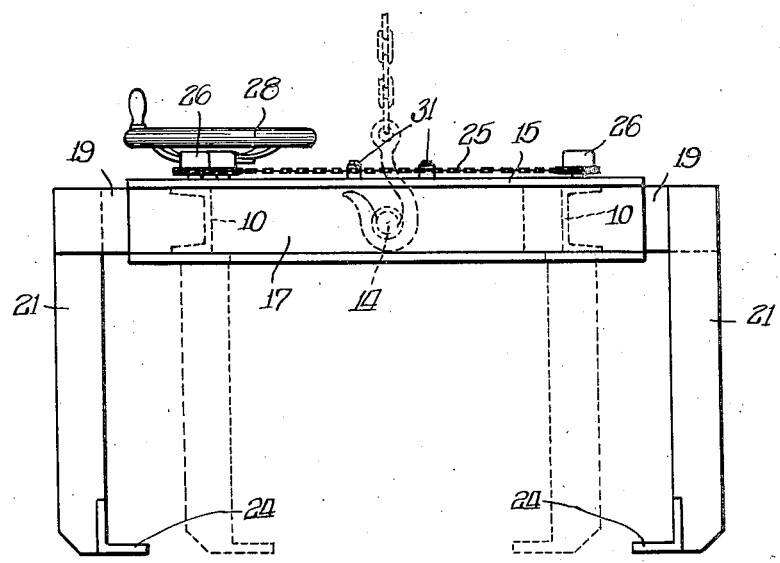
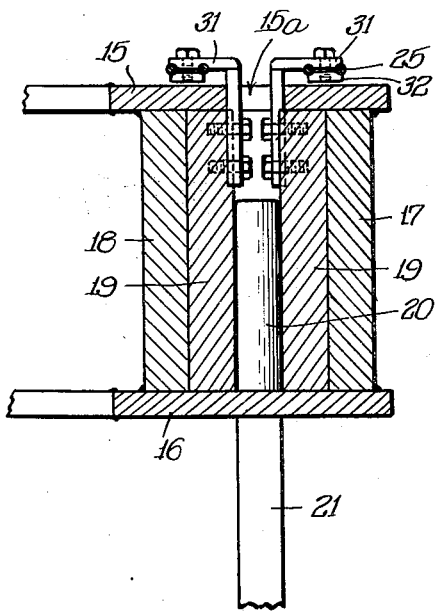
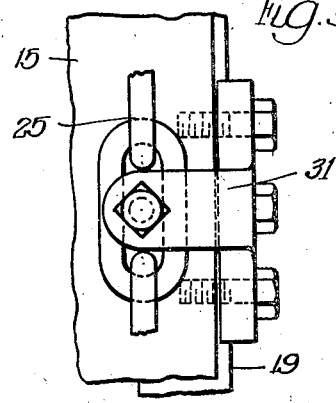
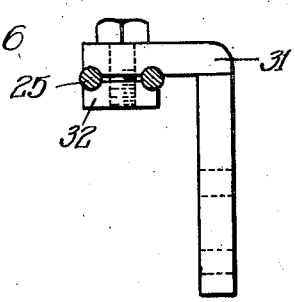
INVENTOR.
Nelson Windsor,
BY Patented Mar. 17, 1942

2,276,905

UNITED STATES PATENT OFFICE 2,276,905

SHEET GRAB FOR HOISTS

Nelson Windsor, South Bend, Ind.

Application July 27, 1940, Serial No. 347,861

13 Claims. (Cl. 294—67)

This invention relates to improvements in grabs suitable for use on hoists of cranes, derricks and similar handling apparatus, for holding bundles of plates, sheets or the like in operations of stacking, unstacking and transporting them.

Metal plates and sheets are customarily stacked in warehouses in bundles piled one on top of another and separated by spacing strips. A bundle comprises any number of plates or sheets convenient for handling as a unit, and in stacking the bundles, as well as in removing them from the stacks for loading in cars or for transportation in a plant or warehouse, it is customary to employ a hoist carried on a crane, gantry, trolley or other type of mobile apparatus. For this purpose, it is necessary to employ some sort of grab which is carried on the hoist and is adapted to engage and securely retain one or more of the bundles in order that they may be lifted and transported and deposited accurately at the desired location.

It is a general object of the present invention to provide a grab adapted for such use which will have the desired strength and stability and which can be operated with convenience, speed and facility, which will have large capacity and which will retain a bundle or plurality of bundles very securely.

One of the particular objects of the present invention is the provision of such a grab which requires a minimum of head space for its operation, thus to permit its being employed over high stacks and to be operated close to an overhead support such as the rail or rails upon which the crane runs.

Another particular object is the provision of a grab which will have maximum strength for its weight and which, for a given width of its frame, will have large capacity or range as to the width of sheets which it can handle with security.

Another particular object is to provide such a grab in which the means for operating and adjusting the work-engaging parts is very efficient and easily operable to move said parts through a wide range, which is entirely relieved of any of the stresses to which the frame and work-supporting parts are subjected in the lifting of heavy loads, and which is easily assembled and immediately accessible for inspection, repair or replacement without involving any dismantling of the frame or work-supporting parts.

A further object is the provision of a grab which may be fabricated throughout from materials and parts which are of standard commercial types.

Other and further objects will be pointed out or indicated hereinafter, or will be apparent to one skilled in the art upon an understanding of the invention or its employment in use.

For the purpose of aiding in an explanation of the invention, I show in the accompanying drawings forming a part of this specification, and hereinafter describe, one form in which it may be embodied. It is to be understood, however, that this is presented by way of illustration only, and is not to be construed in any fashion for the purpose of limiting the appended claims short of the true and most comprehensive scope of the invention in the art.

In said drawings,

Fig. 3 is an end elevational view;

Fig. 4 is a sectional detail on approximately line 4—4 of Fig. 1 on a larger scale;

Fig. 5 is a detail illustrating in top view and on a larger scale a means for connecting the jaw slides to the adjusting chain; and Fig. 6 is a side elevation of same.

Figure 1:
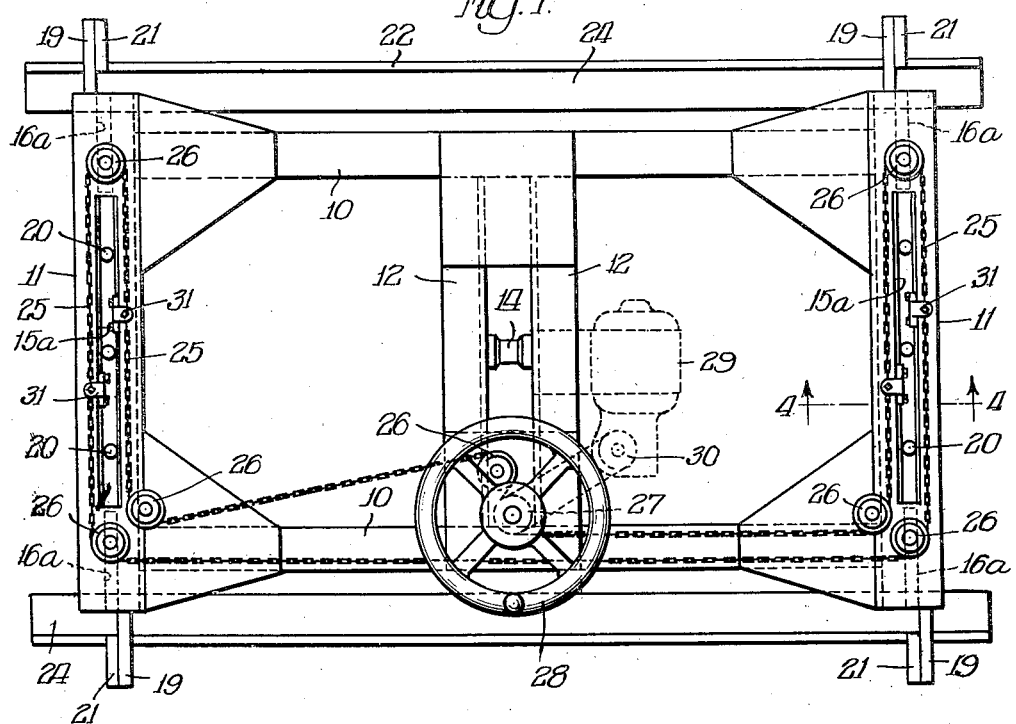
Fig. 1 is a top or plan view of a grab embodying my invention, showing the load-engaging parts partly extended at opposite sides.
Figure 2:
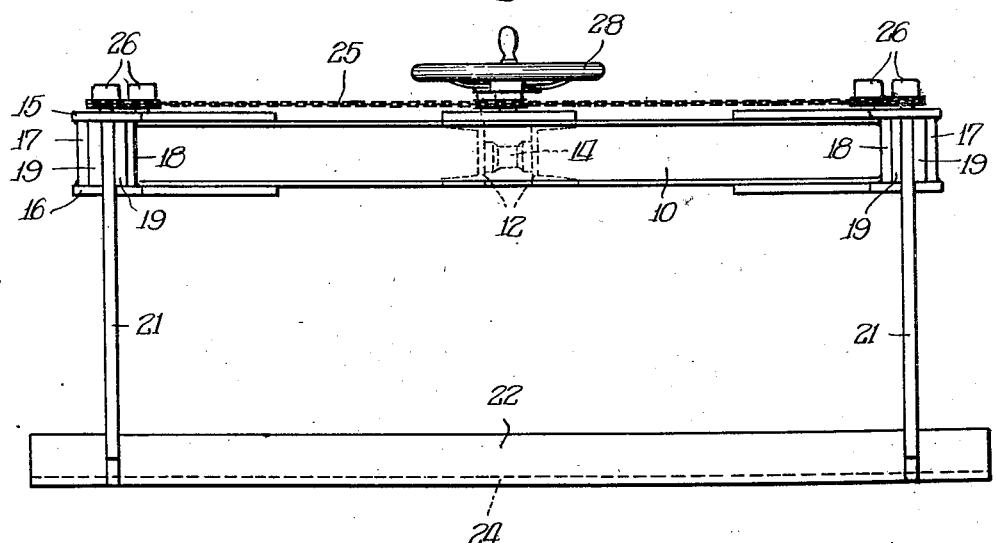
Fig. 2 is a side elevational view of same.

In the construction here illustrated, the grab comprises a rigid rectangular frame having side members 10 which are connected at their ends by box-like end members 11 and also connected at their midportions by transom members 12. At their midpoint the transom members 12 carry a hub 14 adapted to be engaged by the hook of the hoist for the supporting and handling of the grab. The end members 11 are formed by top wall elements 15, bottom wall elements 16, outer wall elements 17, and inner wall elements 18, all of strong and stiff plate material, fastened rigidly to one another preferably throughout their length by electrical welding along their lines of contact. These box-like end members form the housings and supports for the slide bars 19, of which there are two in each end member. These slide bars are strong and rigid members which fit slidably in the housings, their lower edges riding on the bottom members 16 and their upper edges being closely associated with the top members 15 of the housing. The slide bars in each housing travel against the inner surfaces of the side members 17 and 18 respectively, and they are spaced from each other by posts or spacers 20 rigidly mounted on the bottom members 16.

Each of the slide bars 19 has rigidly connected to it at one end a depending jaw member 21, and the two jaw members thus supported at each side of the grab are connected by a rigid angle member 22 having an inwardly extending flange 24 at its bottom. The jaw members 21 on each pair of juxtaposed slide bars are arranged at the sides thereof which are toward the middle line of the end housing in which said slide bars are mounted, and to permit movement of the jaws to positions underneath the bar-supporting members, the end portions of the bottom wall members 16 are slotted to accomodate them, as illustrated at 16a. The slide bars are of length such as to extend to the ends of the end member farthest remote from the jaws when the latter are at their innermost positions. In all positions of adjustment the slide bars 19 are very firmly and strongly supported and guided in parallel relationship by the bottom wall 16, which constitutes a lower bearing member upon which they ride and which affords them support clear out to the ends of the end members 11, and by the top wall portions 15 which constitutes an upper bearing member with which their upper edges engage, and by the side wall portions 17 and 18 and interposed spacers 20. Thus they are adapted to carry heavy loads with security when the jaws 21 are projected substantial distances beyond the slide bar-supporting members as well as when the jaw members are retracted to positions inwardly from said bar-supporting of the end members.

As a means for actuating and adjusting the slide bars 19 transversely of the frame, I provide a suitable chain 25, which is endless or continuous, and is entrained on idling guide sheaves 26 and an actuating sprocket 27, all journaled on the frame in suitable relationship to guide the chain in paths longitudinally over the end members 11 and one of the side members 10. The actuating sprocket 27 may be rotated by a hand wheel 28 to run the chain in either direction, and, as illustrated in Fig. 1 in dotted lines, a suitable motor 29 may be mounted on one of the transom members 12 by means of a bracket, and adapted to drive the actuating sprocket 27 through the medium of a slip clutch 30. The operation of the motor 29 may be under remote control.

Each of the slide bars 19 is connected to the chain at a suitable point, so that when the chain is run in one direction, all of the slide bars will be moved longitudinally to move the jaw members simultaneously outwardly from the frame, and, when the chain is run in the other direction, to move the jaw members inwardly relative to the frame. This connection of the slide bars to the chain may be made by means of suitable clamps 31, such as illustrated in Figs. 5, and 6, which are bolted securely to respective slide bars and engaged retentively with links of the chain, as by a clamping portion, bolt and clamping nut 32 as shown in those figures. To accommodate these clamps and permit their movement longitudinally of the end members, the top walls 15 of the end members are slotted longitudinally in their midportions as illustrated at 15a, but leaving portions overlapping the bars as illustrated in Fig. 4. In order to counterbalance the weight of the hand wheel, chain, and motor if used, suitable weighting elements may be mounted on or between the transom members adjacent the opposite side of the frame.

In the utilization of this grab, the hook of the hoist which is to carry it is engaged with the hub 14, so that the grab may be suspended and moved by the hoist and its supporting and actuating means. While the grab is suspended, the slide bars may be operated by actuating means such as the hand wheel 28, to move the jaws outwardly to a span such as to permit the flanges 24 to be moved down along the opposite sides of a stack of sheets or the like and then the actuating means may be operated to move the jaws inwardly toward the frame so as to introduce the flanges 24 under a bundle or bundles of the sheets until the jaws 21 contact the opposite sides thereof. The bundle or bundles thus within the grasp of the jaws may then be lifted from the stack by elevation of the grab as a whole, in which operation the bundle or bundles will be elevated from the stack by virtue of their support on the jaw flanges 24. As thus supported, the bundle or bundles may be transported with the grab to the desired point of disposal.

It will be observed that although it requires but limited head room for operation and travel, this grab is adapted to handle sheets in a very considerable range of widths. For example, if built with bar-supporting members thirty-six inches long and jaw members five inches wide on slide bars thirty-three inches long, it can handle sheets in a range of from twenty inches to forty-eight inches without extending the respective jaws more than six inches beyond their outer points of support on the bar-supporting members, thus leaving twenty-two inches of each slide bar inside its supporting member. Thus, without reducing the proportion of supported bar length to projected bar length to a ratio less than 22:6 and without involving any variation in the amount of head space required for its operation, this grab is adapted for the handling of a range of sheet widths for which two grabs, of different sizes, heretofore have generally been necessary. In all of their positions of adjustment, moreover, the slide bars are very strongly and securely supported by virtue of the extensive continuous bearing surfaces afforded them by the top and bottom plates 15 and 16.

The jaw adjusting means enables the desired adjustments of the work-supporting members to be made quickly and with expenditure of but little power and effects positive actuation of the slide bars directly in their lines of movement. Moreover, since the jaw adjusting mechanism is located entirely above the slide bars, it permits their being securely supported against tilting laterally in either direction as well as accurately guided for their longitudinal movements. In addition to these advantages, this actuating mechanism is entirely free from any of the lifting stresses to which the work-supporting parts may be subjected, as it does not have to do any of the guiding of those parts and is not cramped or otherwise adversely affected by any slight disalignment of them. Consequently, the slide bars may have liberal clearances relative to the parts which guide them, thus permitting them to be assembled with ease and facilitating their movement freely relative to the guides and one another in the adjusting operations. The character and arrangement of the adjusting mechanism render it entirely clear of the operated parts and permit its being inspected and repaired or replaced without involving any disassembling of other parts of the structure. It will be understood that while I refer to the member 25 as a chain, the invention is not limited to the use of that specific kind of means for operating the bars.

What I claim is:

1. In a grab of the sort described, a frame having bar-supporting members affording rigidly associated upper and lower bearing walls, a pair of slide bars mounted on each of said bar-supporting members with their lower sides in bearing engagement with said lower walls and their upper sides in bearing association with said upper walls, one bar of each pair carrying a jaw at one of its ends and the other bar of each pair carrying a jaw at its opposite end, each jaw depending from its bar in a position offset laterally toward the associated bar of the pair and said lower walls affording slots between the bars of each pair to accommodate movement of the offset jaw portions to positions under the bar-supporting members, and means for actuating the slide bars to shift them longitudinally.

2. In a grab of the sort described, a frame having transversely extending members formed with rigidly associated upper and lower walls, slide bars slidably mounted between said upper and lower walls and having bearing cooperation therewith to retain said bars in the same plane, each of said bars carrying at one end a depending jaw portion offset laterally from it, the lower walls affording slots at their ends laterally of the bars to accommodate said offset depending jaw portions, and means for actuating the bars to slide them longitudinally and move said depending jaw portions into and out of said slots.

3. In a grab of the sort described, a structure as specified in claim 2 and including ledges carried by said depending jaw portions at positions below the level of the frame and projecting inwardly of the frame.

4. In a grab of the sort described having a rigid frame, the combination of slide bars slidably mounted on the frame for longitdinal movement in parallel relationship, load-engaging jaws carried by said bars and depending below the frame, a chain movably mounted on the frame, means for guiding portions of said chain for movement in directions parallel with the bars, means connecting the bars individually with said chain, and means for actuating said chain to move the bars longitudinally on the frame.

5. In a grab of the sort described, having a rigid frame with transversely extending bar-supporting members, the combination of slide bars mounted on said bar-supporting members and extending longitudinally thereof in parallel relationship, load-engaging jaws carried by said bars and depending below the frame, a chain operably mounted on the frame, actuating means mounted on the frame for running said chain longitudinally, means on the frame for guiding portions of said chain for travel parallel with the respective bars on each bar-supporting member, and means connecting the bars individually to the chain to effect longitudinal movement of the bars upon longitudinal running of the chain.

6. In a grab of the sort described, a structure as specified in claim 5 and wherein the bars are arranged in pairs on respective bar supporting members and the bars of a pair are connected to respective portions of the chain which move simultaneously in opposite directions longitudinally of the bars when the chain is operated by its actuating means.

7. In a grab of the sort described having a rigid frame with bar-supporting members, the combination of slide bars slidably mounted on the bar-supporting members for movement longitudinally thereof, load-supporting jaws carried by said bars and depending below the frame, adjusting means mounted on the frame entirely above the bars and connected to them individually, and means mounted on the frame for actuating said adjusting means to move the bars longitudinally on the bar-supporting members.

8. In a grab of the sort described having a rigid frame including slide bar supports, the combination of slide bars slidably mounted for movement longitudinally on said supports, load-supporting jaws carried by said bars and depending below the frame, adjusting means movably mounted on the frame entirely above the bars, connections extending upwardly from the bars and connecting them individually to said adjusting means, and actuating means mounted on the frame and operable to move the adjusting means to shift the bars longitudinally on the bar supports.

9. In a grab of the sort described, a structure as specified in claim 8 and wherein said slide bar supports have portions extending longitudinally thereof for bearing cooperation with the upper and lower sides of the slide bars.

10. In a grab of the sort described, a structure as specified in claim 8 and wherein said slide bar supports include portions arranged for guiding cooperation with opposite sides of the respective slide bars to guide the latter in their longitudinal movement.

11. In a grab of the sort described, a structure as specified in claim 8 and wherein said slide bar supports include portions arranged for guiding cooperation with sides of the slide bars to guide them in parallel relationship in their longitudinal movements.

12. A grab for the purpose described comprising a frame having bar-supporting members affording upper and lower bearing portions, slide bars slidably mounted on said bar-supporting members with their lower sides bearing upon said lower bearing portions and their upper sides associated with said upper bearing portions, a load-supporting jaw carried by beach slide bar and extending downwardly therefrom in a location offset laterally from the bar and from the lower bearing portion on which the bar bears, and means for shifting the slide bars longitudinally on the bar-supporting members to position the downwardly extending jaws at selected locations intermediate the extremities of the bar-supporting members and at selected locations outwardly beyond said extremities.

13. A grab as specified in claim 12 and wherein the respective jaws are disposed adjacent an end of the respective slide bars and each slide bar has bearing engagement with a lower bearing portion of its supporting member at the end of the latter which is nearest the jaw-carrying end of such slide bar.

NELSON WINDSOR.